Patented Mar. 31, 1931

1,798,840

UNITED STATES PATENT OFFICE

HENRY J. HEMINGWAY AND WILLIAM A. WEIDLICH, OF BOUND BROOK, NEW JERSEY

PIGMENTED LACQUER BASE

No Drawing. Application filed October 13, 1930. Serial No. 488,548.

This invention relates to a novel method of preparing pigmented lacquer bases and primarily has for its object obtaining a lacquer-base of a type possessing superlative quality in fineness, texture and uniformity of pigmentation, while also effecting great economies, over present practices, in the manufacture of the new product.

Heretofore in the practical manufacture of pigmented lacquer bases one of the operations which has been considered indispensable is that of a thoroughly grinding the preformed pigment preliminary to or upon its introduction into the film forming constituents, the grinding operation frequently occupying periods of from twenty-four to one hundred hours to reduce the pigment to a sufficient fineness to make a satisfactory product, as well as to bring about a thorough "wetting" of the pigment, with the liquids. A great amount of time is required for these grinding operations and with a large number of different pigments to be considered, a very heavy outlay of capital is required to supply and maintain separate grinding equipment for the different pigments.

Furthermore, this preliminary grinding step for pigments, as heretofore practiced, also has had, as indicated, assigned to it the function of bringing about a thorough wetting of the pigment which has a natural physical repulsion for the liquid media which must be overcome by continued and extensive grinding in the presence of the wetting media. Some attempts have been made to facilitate this operation of wetting, and to bring about a dispersion of pigments in the wetting media, by dispersing the pigment in water and then incorporating the pigment with a soluble solid constituent. The whole mass is then later dehydrated with alcohol, and that known process is more directly applicable to cases where a color pigment is produced by chemical precipitation upon a cellulosic base. According to that method where an attempt is made to pigment a cellulosic base with pigment in a watery media, there is a pronounced tendency during the subsequent dehydration with alcohol for the pigment again to flocculate; and, particularly in the case of lacquer enamels upon the addition of solvents, such as ethyl acetate to the pigmented nitrocellulose, flocculation is inevitable, and the original more or less satisfactory dispersion in the aqueous fluid is destroyed in part or in whole by flocculation.

Accordingly, a distinctive and principal object of the present invention is that of utilizing a method of procedure, in the preparation of a pigmented lacquer base, which entirely eliminates the use of grinding machinery and grinding operations of any kind, while at the same time insuring optimum dispersion of the pigment without the necessity of preliminary aqueous dispersion and with a minimum expenditure of energy. Thus the time element in the making of the lacquer base is very greatly shortened and the use of extensive grinding machinery obviated, while at the same time in the case of pigments upon a soluble cellulosic base, a pigmented product is evolved of such a character and in such physical condition that solvents may later be added in the manufacture of the finished lacquer without again destroying the dispersion by reagglomeration or by flocculation.

Therefore, a feature of practical importance in carrying forward the invention is that of providing a process which effectually breaks down all agglomeration and so controls the viscosity or internal friction that at no time during the process of manufacture shall the pigment particles be allowed to agglomerate or flocculate.

The precise order in which the steps of the process may be carried out, as well as the formulæ for the batches, necessarily are susceptible of a wide range of modification without departing from the spirit or scope of the invention and by way of example one successful way of carrying the invention into effect may briefly be described as follows:—

For instance, taking commercial nitrocellulose as the film forming constituent or binder, a formula, by way of example, which may be utilized in the first stages of the new method would include:—

Eighty-six pounds of pigment (e. g. titanox).

Fifteen pounds of alcohol.
Five pounds of ethyl acetate.
Fifteen pounds of nitrocellulose.

Preliminarily, the batch of commercial nitrocellulose which usually is handled in alcohol-damp condition has added thereto such an additional quantity of alcohol or other suitable non-aqueous liquid, such as xylol, toluol, benzol or equivalent derivatives which will not only completely wet the body of the nitrocellulose, but all the particle surface of such quantity of pigment as the formula calls for.

This first stage of the process includes the mixing and kneading together, in a mixing machine of any approved type, a partly wetted or dampened nitrocellulose body with the supplementary addition of alcohol or equivalent chemical until the excess alcohol or equivalent chemical has been taken up by the nitrocellulose by capillarity.

The second stage, of the process being described as one example of the invention, involves the distinctive feature of incorporating the pigment with the film forming constituent of the lacquer, and that step consists in adding to the completely wetted nitrocellulose mass the entire charge of commercial pigment without employment of grinding. The mixing and kneading operation goes forward in this second stage of the process producing what may be termed a pigment tree of nitrocellulose foliated with pigment particles, that is, the pigment particles in this operation becoming uniformly spread over and upon the surfaces of the nitrocellulose and absorbed thereon. At the same time the nitrocellulose body becomes opened up and simultaneously the pigment particles will have been completely dampened with the excess non-aqueous liquid utilized in the first stage of preparing the nitrocellulose.

The next or third stage in the evolution of the described process involves the addition of the remaining diluents, for example, two pounds of alcohol, five pounds of ethyl acetate and ten pounds toluol and the continuation of the mixing operation in the mixing machine. In this stage of the process the nitrocellulose becomes dissolved, changing from its fibrous state to a continuous phase producing a smooth plastic mass whose viscosity or internal friction is controlled so that the pigment particles become reduced to an impalpable phase and evenly and uniformly dispersed or diffused throughout the product. Accordingly, this stage of the process is of extreme practical importance because it is depended upon to prevent reagglomeration of the pigment particles and to reduce such particles to a fineness or phase which is quite impossible through any grinding operation heretofore practiced and to obtain that desirable and important result the viscosity of the mass in the said third stage of the process must be controlled by the presence of only sufficient liquid to maintain an effective viscosity and not enough liquid to float the pigment particles so as to thereby permit them to flocculate. Because of this viscosity or internal friction, maintained in the manner described, the mass movement of particles against particles and the shearing action involved in the movement of the viscous mass effects the reduction of the pigment to its impalpable phase, at the same time causing its even and smooth diffusion throughout.

Since industrial use demands a more fluid substance than results from the preceding stage three of the described process, additional solvent is gradually added, with which solvent is blended as large a proportion of alcohol or other suitable diluent as may be used without permitting reagglomeration.

Thus, it will be seen from the foregoing description of the example selected that as distinguished from prior methods which rely for satisfactory dispersion of the pigment on the intensity of the grinding it will be seen that the present method does not employ grinding at any stage and relies on the incorporation of the dry pigment with damp nitrocellulose in the presence of a non-aqueous liquid, the retention of the pigment particles in a dispersed condition by adsorption on the nitrocellulose during the fibrous state, and by retention at all times during the change from fibrous to continuous phase in the nitrocellulose of a high internal resistance or viscosity throughout the mass. Thus, the present invention accomplishes the desirable objects herein set forth without resorting to grinding for the pigments and without resorting to a preliminary water dispersion, as heretofore practiced, because according to the present invention as the agglomerates, by friction and shearing break themselves down in the presence of, and intimate contact with, the fibrous structure of the cellulose material, the dispersed particles become evenly distributed along the fibres of said material and so having been once deflocculated the tendency to reflocculate is overcome and the operation of the process is continuous and goes forward from the mixing of the constituents through to the finished product in one machine or mixer of the approved type, and optimum dispersion of the pigment by the simple process of a brief mixing operation is accomplished.

While one mode of practicing the process has been selected to exemplify the invention it will be understood that this example of the invention is for the purpose of setting out the several phases through which the mix or batch passes producing the final product, because it has been found that satisfactory results can be obtained by mixing together at one time all of the ingredients or constituents of the formulæ and carrying the mixing or kneading operation forward until the product is complete. However, even with that way of carrying out the invention the batch necessarily passes through the several phases or stages described, and in this example, as in the case of the previously cited example, the essential factor to the success of the process involves the retention at and during each stage of the mix of a condition of high viscosity or internal friction whereby the results previously secured by extensive grinding are achieved by and within the mass itself. It is therefore within the purview of the present invention to resort to changes or modification of the steps of the process or in the order of such steps or in the formulæ used without departing from the spirit or scope of the invention as set forth in the appended claim, and it is also to be understood that the present invention is intended to cover a method of preparing a base for the production of lacquer enamels but also is applicable to a preparation of a base for finishing protective or decorative coatings containing nitrocellulose and pigment.

We claim:

An improved method for preparing a pigmented lacquer base which consists in the new step of first subjecting without grinding or rolling pressure a non-aqueous mix of nitrocellulose and unground pigment solely to the kneading action of a mixing machine in the presence of a relatively small quantity of a liquid volatile solvent to initiate the chemical action of dissolving the nitrocellulose simultaneously with the pulverization of the pigment and its dispersion throughout the batch, the said initial quantity of liquid solvent being insufficient to complete the dissolution of the introcellulose but of an amount to thereby maintain and control a high viscosity during the said kneading action thereby producing in the mass while being kneaded an internal attrition of pigment particles against pigment particles causing by such attrition alone the breaking down of the agglomerates and/or flocculates and dispersing the finely divided pigment throughout the film-forming vehicle, and subsequently introducing and working into the mass the remaining predetermined amount of solvent necessary to complete the dissolution of the nitrocellulose to change it into a continuous viscous phase.

In testimony whereof we hereunto affix our signatures.

HENRY J. HEMINGWAY.
WILLIAM A. WEIDLICH.